United States Patent [19]

Keirstead et al.

[11] Patent Number: 5,561,547

[45] Date of Patent: Oct. 1, 1996

[54] THERMAL LENS OF CONTROLLED ELLIPICITY

[75] Inventors: Mark S. Keirstead, San Jose; William L. Nighan, Jr., Menlo Park; Thomas M. Baer, Mountain View, all of Calif.

[73] Assignee: Spectra-Physics Lasers, Inc., Mountain View, Calif.

[21] Appl. No.: 191,654

[22] Filed: Feb. 4, 1994

[51] Int. Cl.$^6$ ............................................. G02F 1/01
[52] U.S. Cl. ................... 359/288; 359/246; 359/290; 372/19; 372/34; 372/41; 372/69; 372/71
[58] Field of Search ...................... 359/254, 288, 359/290, 298, 299, 246; 372/19, 41, 69, 72, 33, 34, 35, 36, 70, 71, 101; 385/34

[56] References Cited

U.S. PATENT DOCUMENTS

| | | | |
|---|---|---|---|
| 4,767,197 | 8/1988 | Yeh | 359/299 |
| 4,886,331 | 12/1989 | Peterson | 359/288 |
| 5,048,051 | 9/1991 | Zayhowski | 372/101 |
| 5,053,617 | 10/1991 | Kakizaki et al. | 359/288 |
| 5,099,355 | 3/1992 | Tomita | 359/288 |
| 5,121,246 | 6/1992 | Lasher et al. | 359/288 |
| 5,125,001 | 6/1992 | Yagi et al. | 372/66 |
| 5,148,445 | 9/1992 | Liu et al. | 372/71 |
| 5,289,491 | 2/1994 | Dixon | 372/34 |
| 5,410,559 | 4/1995 | Nighan, Jr. et al. | 372/19 |

FOREIGN PATENT DOCUMENTS 920265307 3/1994 Japan.

OTHER PUBLICATIONS

Plaessmann, H. et al., "Multipass Diode–Pumped Solid–State Optical Amplifier", Optics Letters, vol. 18, No. 17, pp. 1420–1422, Sep. 1, 1993.

*Primary Examiner*—Loha Ben
*Attorney, Agent, or Firm*—Haynes & Davis

[57] ABSTRACT

The ellipticity of a thermal lens is controlled in a diode-pumped anisotropic crystal, such as Nd:YVO4. The crystal has two opposing optical end faces through which a pump beam and an output beam pass. The crystal also has opposing "c" axis crystal faces normal to a "c" axis of the crystal, and opposing "a" axis crystal faces that are normal to an "a" axis of the crystal. A mount supports the crystal and serves as a heat sink. A path is created to conduct heat from the crystal through the "c" faces, while the "a" faces are thermally isolated from heat conduction. The thermal lens ellipticity is controlled in order to produce a round, diffraction limited gaussian beam suitable for applications that require a high power, good quality beam from a simple, reliable laser source.

46 Claims, 4 Drawing Sheets

$\phi_P - \phi_V = 2.8$ WAVES

THERMAL LENS OF CONTROLLED ELLIPICITY

CROSS-REFERENCE TO RELATED APPLICATIONS

DIODE PUMPED LASER WITH STRONG THERMAL LENS CRYSTAL, U.S. Pat. No. 5,410,559, issued Apr. 25, 1995, inventors William L. Nighan, Jr. and Mark K. Kierstead, assigned to the assignee of the instant application, incorporated herein by reference.

FIELD OF THE INVENTION

This invention relates generally to thermal lens, and more particularly to nearly circular thermal lenses made of anisotropic crystals.

BACKGROUND OF THE INVENTION

Cylindrical rod geometries are common for laser crystals, such as Nd:YAG, and have been widely utilized because the desired TEM00 laser mode exhibits radial and azimuthal symmetry. Large lamp pumped laserheads typically use water-cooled rods.

As reported by Baer et al. in his early work with diode pumped systems, a rod is a suitable geometry for an isotropic crystal and a cylindrically symmetric pumped volume. If the circumference of the rod uniformly contacts a heat sink, with low thermal impedance, then the temperature at the circumference of the rod is held to a uniform temperature close to that of the heat sink. With a cylindrical rod geometry the heat flow and resultant thermal gradients are radial. When the material exhibits a non-zero variation in the index of refraction, as a function of temperature, the radial gradients in the index of refraction as a function of radius result in a circular thermal lens. Any bulge or distortion of the pumped surface of such a rod contributes to the magnitude of the thermal lens. A composite is generated by the sum of the focussing effects of the index of refraction variation and the surface distortion. Longitudinally pumping of rods made of isotropic materials, uniformly heatsunk around the rod's circumference, or mounted in other ways that allow radial heat flow, generate index variations and surface distortions. The composite thermal lens is therefore radially symmetric; that is, the curves of constant phase are circles.

In low power laser systems, less than 2 W, the thermal lens can often be ignored. This is because the focussing power of the thermal lens in a low power system is typically much lower than the focussing power of other optics in the laserhead, such as an end mirror with a curved surface. In high power laser systems, greater than 2 W, the focussing or defocussing power of the thermal lens can be significant; the focussing power can be comparable to or even much greater than the focussing power of other optics in the laser resonator. Strong and weak thermal lens focussing powers are defined as follows:

Strong thermal lens: The focussing power of the pump induced lens is at least comparable to that of the other optics in the laser resonator. A strong thermal lens significantly changes the size and divergence of a laser resonator eigen mode within the resonator.

Weak thermal lens: The focussing power of the pump induced lens is substantially lower than that of the other optics in the laser resonator such as mirrors and typical lenses. The other optics in the laser resonator dictate the size and divergence of the resonator eigen mode.

There are key differences between Nd:YVO4 and Nd:YAG, primarily Nd:YAG is nearly isotropic in its crystal properties while Nd:YVO4 is strongly anisotropic. For this reason, given a round pump source, it is relatively straightforward to generate a round thermal lens in Nd:YAG. Investigators have reported that it is difficult to produce a round thermal lens in an anisotropic material such as Nd:YLF or Nd:YVO4. Such materials, and in particular Nd:YVO4, have optical, thermal and mechanical characteristics that are greatly different along the ordinary and extraordinary crystallographic axes. Overall radial symmetry of the thermal lens is not expected.

With Nd:YVO4, the thermal expansion coefficient in a direction parallel to the "a" axis is about 2.5 times smaller than that parallel to the "c" axis. The variation of the index of refraction, as a function of temperature, is different by about a factor of 2.8 along the "c" and "a" axes. Additionally, there is more than a 10% difference between the indices of refraction for the two crystallographic axes. The material Nd:YVO4 is strongly anisotropic that a radially symmetric thermal lens is difficult to produce.

FIG. 1 illustrates the contours of constant phase for a thermal lens that was generated in Nd:YVO4 with a diode pump source. A pump power of 15 W was focussed to a 0.6 mm diameter spot. The thermal lens was measured by placing it in a typical shear interferometer using standard, commercially available fringe capture software. The peak to valley phase difference is 2.9 radians; this corresponds to a very strong focussing power (the effective focal length of the lens is approximately 10 cm). In this case, the constant phase contours are ellipses and the thermal lens is, therefore, "elliptical". This elliptical shape results in a different focal power in one plane than in the other, or $fx/fy \neq 1$, where $fx$ and $fy$ are the focal lengths of the thermal lens in the x and y planes. In the example of FIG. 1, $fx/fy=1.2$. For a "circular" lens, the value of $fx/fy$ does not equal 1. This would approximate a simple spherical lens. An elliptical thermal lens is defined as one where $fx/fy$ does not equal 1, and a circular thermal lens is the special case of $fx/fy \sim 1$. Either $fx$ or $fy$ can have negative values. This results from a value of $dn/dt$ that is negative, as is the case with Nd:YLF.

Researchers have reported elliptical, astigmatic and other non-circular thermal lenses in anisotropic media, particularly Nd:YVO4. See for example Henry Plaessman, Sean A. Re, Joseph J. Alonis, David L. Vecht and William Grossman, Opt. Lett. 18, 1420 (1993). The problem with non-radially symmetric thermal lenses that are strong in a laser resonator is that it is difficult to generate a round, non-astigmatic laser beam with very high beam quality.

With a variety of complex configurations the ellipticity can be reduced. For example, special compensating lenses can be used. However, such methods are costly and typically cannot work for a range of pump power, since the thermal lens magnitude and ellipticity are a function of pump power.

It would be highly desirable to produce an output beam from a laser using an anisotropic material that is substantially round and is a diffraction limited gaussian beam. This type of output beam would be particularly attractive for Nd:YVO4 crystals.

SUMMARY OF THE INVENTION

An object of the invention is to provide a device for controlling the ratio $fx/fy$ to a desired ratio in order to control the ellipticity of the pump-induced thermal lens in an anisotropic laser crystal.

A further object of the invention is to provide a substantially round, diffraction limited gaussian beam from a laser with an anisotropic active media.

Another object of the invention is to produce a substantially round, diffraction limited gaussian beam from a laser that contains an Nd:YVO4 crystal.

Yet another object of the invention is to control the ratio fx/fy and the ellipticity of the pump-induced thermal lens in a diode pumped amplifier that uses an anisotropic laser crystal.

Still a further object of the invention is to mount an anisotropic material in a manner to produce the desired round, diffraction limited gaussian output beam from a laser or amplifier that uses the material..

Additional objects, advantages, and novel features of the invention will be set forth in part in the description which follows, and in part will become apparent to those skilled in the an upon examination of the following, or may be learned by practice of the invention. The objects and advantages of the invention may be realized and obtained by means of the instrumentalities and combinations particularly pointed out in the appended claims.

The present invention includes a pump induced thermal lens having a focal length fx in an x direction, a focal length fy in a y direction and a desired fx/fy ratio. An anisotropic crystal, having opposing first and second end faces through which a pump beam and an output beam, is included. A mount supports the crystal and directs heat flow in the crystal to produce the direction fx/fy ratio.

In one embodiment, the thermal lens of controlled ellipticity of the invention includes an anisotropic crystal with opposing first and second optical end faces through which a pump beam and an output beam pass. The crystal may be a uniaxial birefringent crystal. Opposing "c" axis crystal faces, defined as normal to a "c" axis of the crystal, and opposing "a" axis crystal faces, normal to the "a" axis of the crystal, further define the geometry of the crystal. A mount supports the crystal and provides a desired path of heat conduction through the "c" faces of the crystal. The "a" faces are thermally isolated.

In one embodiment, the crystal is Nd:YVO4. The heat sink and crystal can be mounted in a linear, two mirror laserhead. The laserhead is end-pumped by a fiber-bundle-coupled diode bar. Standard spherical lenses are used to image the output end of the fiber optic bundle onto the crystal, delivering up to about 13 W of diode pump power to the crystal. The size of the pump beam can be adjusted to mode-match the size of the TEM00 mode of the laser resonator. This pump power results in approximately 5 W power at 1.064 micrometer in a beam of excellent spatial quality. The output beam is substantially round because the heat sinking technique circularizes the thermal lens in the Nd:YVO4 crystal. The output beam generated is substantially round, the M2 of the beam is less than about 1.2 and can be less than 1.05, and the least squares deviation of the beam profile from a gaussian is less than about 10%, and can be less than 1%. M2 is defined as the ratio of the ideal confocal parameter to the gaussian actual confocal parameter. A perfect beam is defined as M2=1. These characteristics indicate that a round, diffraction limited gaussian beam has been created.

As compared to the cylindrical rod symmetry utilized for Nd:YAG systems, the present invention has a geometry that achieves a substantially round thermal lens in an end-pumped anisotropic material such as Nd:YVO4. This simplifies the task of generating a round, high power beam of nearly diffraction-limited quality with high efficiency in a diode-pumped configuration.

Applications for the output beam include those that require a high power, high quality beam from a simple but reliable laser source. An example is the need for a round, non-astigmatic beam that is nearly diffraction limited for the exposure of film. This is required because a small, round, diffraction limited spot must be generated on the film.

DETAILED DESCRIPTION OF THE PREFERRED EMBODIMENTS

Figure 1:
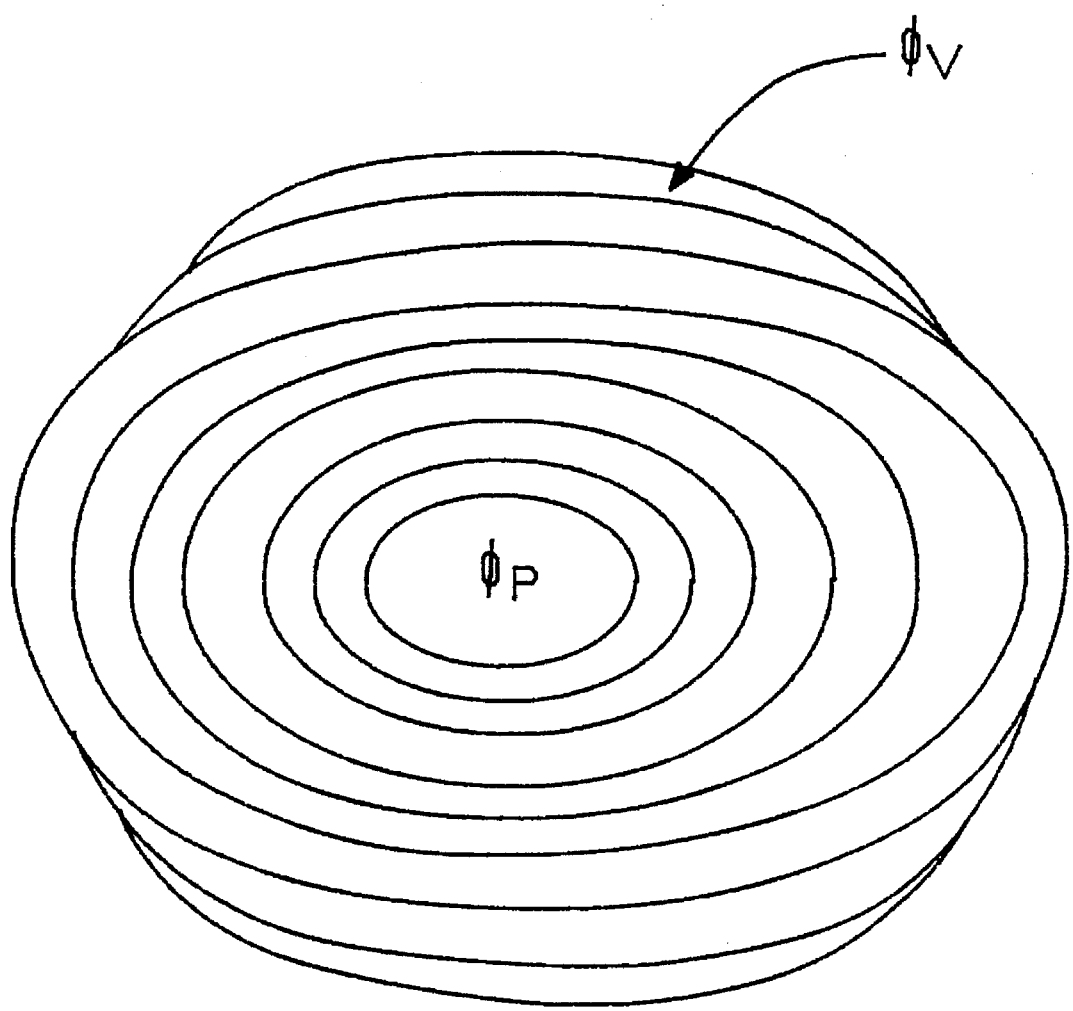
FIG. 1 illustrates the contours of constant phase for a thermal lens that is generated in Nd:YVO4 with a diode pump source.
Figure 2A:
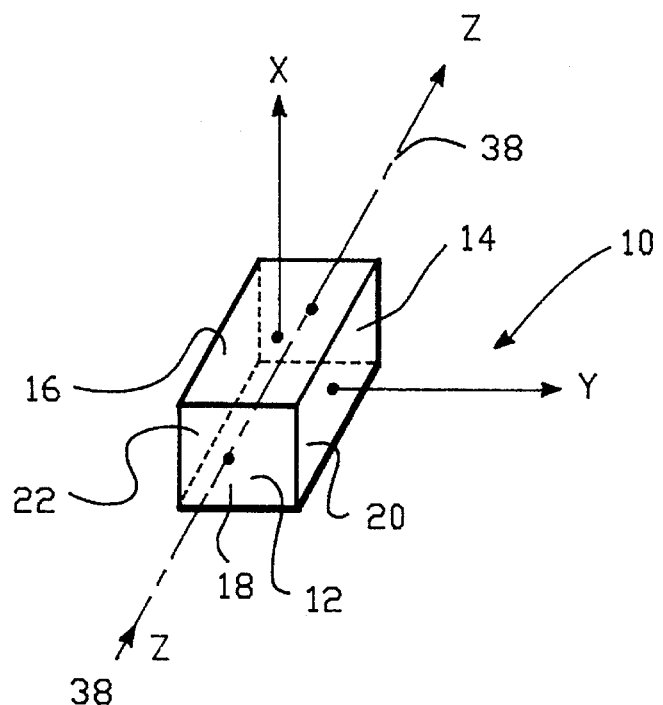
FIG. 2(A) is a perspective view of an anisotropic crystal used in the invention showing three faces of the crystal.

Referring to FIG. 2(A), an anisotropic crystal 10 has two opposing optical end faces 12 and 14 through which a pump beam and an output beam pass, substantially parallel to the Z axis of a laser resonator. The orthogonal directions, x and y are orthogonal to Z, the direction of propagation. A thermal lens is generated by a pump beam incident upon 12 or 14. If the lens is "elliptical", the focal length fx and fy are unequal such that fx/fy does not equal 1. The relative amount of heat flow, as well as its direction of travel, in crystal 10 is controlled in the x and y directions in order to achieve a desired degree of ellipticity, or non-ellipticity of the thermal lens. If fx/fy~1, the thermal lens is round.

Figure 2C:
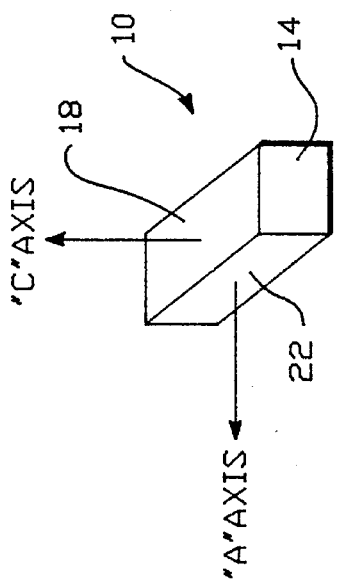
FIG. 2(C) is a second perspective view of an anisotropic crystal illustrated in FIG. 2(B), with the crystal rotated to show the corresponding opposing crystal faces.
Figure 2B:
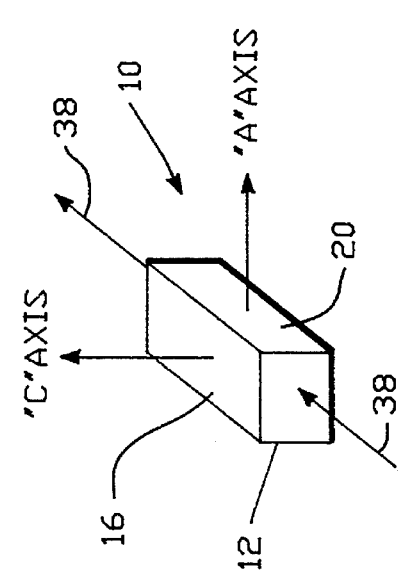
FIG. 2(B) is a first perspective view of an anisotropic crystal that is uniaxial. The "c" axis is oriented parallel to the x direction, and the "a" axis is oriented parallel to the y direction.

In FIGS. 2(B) and 2(C), an anisotropic crystal 10 has two opposing optical end faces 12 and 14 through which a pump beam and an output beam pass. In this embodiment, when crystal 10 is positioned in a laser resonator "c" is substantially parallel to x and "a" is substantially parallel to y. Crystal 10 is cut in such a manner that the "c" axis of crystal 10 is normal to two opposing "c" axis crystal faces 16 and 18, and the "a" axis is normal to two opposing "a" axis crystal faces 20 and 22. Optical end faces 12 and 14 may be coated with a suitable antireflection coating with minimal reflectivity at both the laser and diode pump wavelengths, such as SiO2 or TiO2, in a thickness of about 3 to 5 layers. These coatings can be commercially applied by Litton-Airtron, Charlotte, N.C.

Crystal 10 is made of an anisotropic material. Suitable crystals are made of a birefringent material where the optical, thermal and mechanical properties are not isotropic, and management of heat flow in the crystal helps to shape the lens. Satisfactory materials include but are not limited to Nd:YVO4, Nd:YLF, Nd:GVO4, Nd:SVAP, Nd:LMA, Nd:YALO, Nd:BEL, Nd:YPO4 and Nd:LSB. A preferred material is Nd:YVO4, commercially available from Litton-Airtron. The atomic percentage of Nd is about 0.5 to 3.0%, preferably about 0.6 to 0.9%, and most preferably about 0.8%.

The geometry of crystal 10 may be non-cylindrical. Cylindrical rods can be used but they are less convenient in forcing heat flow in a non-cylindrically symmetric fashion. Preferred geometries are cubic or rectangular. Face pairs 12 and 14, 16 and 18, and 20 and 22 are substantially parallel. They need not be perfectly parallel but are flat. There can be a small wedge between respective faces defined by an angle of about 1 degree. This is done to prevent etalon effects and eliminate parasitic reflections.

Geometry and size of crystal 10 are important considerations. It has been discovered that smaller sizes of crystal 10 are preferred. In one embodiment, crystal 10 has optical end face 12 and 14 dimensions of about 3 to 4 mm, with 1 mm being the smallest desirable dimension. The length of crystal 10 can correspond to the dimension of end faces 12 and 14. Additionally, in the rectangular geometry, a length of about 1 to 10 mm is suitable. A preferred length is in the range of about 4 to 8 mm, and more preferably about 4 mm.

Actual size of crystal 10 is significant. If it is infinitely large then heat flow is difficult to manage and an elliptical output beam is generated. In this instance the exterior surfaces of crystal 10 have thermal gradients that are too low to control the heat conduction path. However, control of heat conduction is much easier and pronounced with smaller crystals.

Optical, thermal and mechanical characteristics of anisotropic materials, particularly Nd:YVO4, are greatly different along the "a" and "c" axes. In Nd:YVO4, gain is higher for laser polarizations parallel to the "c" axis. Lasers using Nd:YVO4 are therefore configured to operate with a polarization parallel to the "c" axis. This corresponds to the x direction in FIG. 2(A). With Nd:YVO4, the thermal expansion coefficient in a direction parallel to the "a" axis is about 2.5 times smaller than that parallel to the "c" axis. The variation of the index of refraction as a function of temperature is different by about a factor of about 2.8 along the "c" and "a" axes. Because it is so strongly birefringent, there is more than a 10% difference between the indices of refraction for the two crystallographic axes. Because of the strong anisotropy, a radially symmetric thermal lens is not expected. That is, end-pumping with a round pump source is not expected to produce a thermal lens with fx/fy=1.

Figure 3:
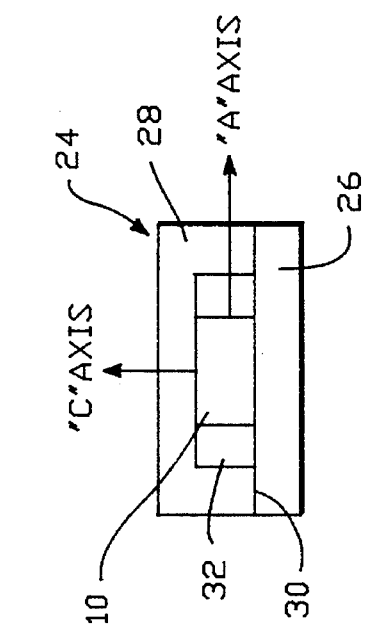
FIG. 3 is a cross-sectional view of the anisotropic crystal in its mount.

As shown in FIG. 3, the thermal lens of the present invention is created by mounting crystal 10 to a heat sink 24. Heat sink 24 can be made of copper. Other suitable materials include a heat thermal conduction material such as copper, aluminum plated for soldering or alumina. Heat sink 24 can be configured in two sections 26 and 28. A solder 30 is deposited on "c" axis crystal faces 16 and 18 in order to reduce thermal impedance between "c" axis faces 16, 18 and heat sink 24. A suitable solder has a low melting temperature such as Solder 1E, available from the Indium Corporation of America, Utica, N.Y. Other materials are possible and can include thermally conductive epoxies such as Tra-Bond 2151, available from Tra-Con, Inc., Medford, Mass., as well as thermal greases. An example of a thermal grease is Dow Corning 340, available from Dow Corning, Midland, Mich. Heat sink 24, and its respective sections 26 and 28, can be plated in order to improve the adherence to the solder. Satisfactory plating materials include but are not limited to nickel or silver. An air gap 32 is formed at the exterior of "a" axis crystal faces 20 and 22.

Sections 26 and 28 can be "tinned" with indium prior to assembly with crystal 10. One technique for soldering crystal 10 in place is to wrap it in one or two layers of 1–2 mil indium foil, place it in between sections 26 and 28 of the pretinned heat sink 24, and then place the entire assembly on a hot plate at about 175 degrees C.

Figure 4:
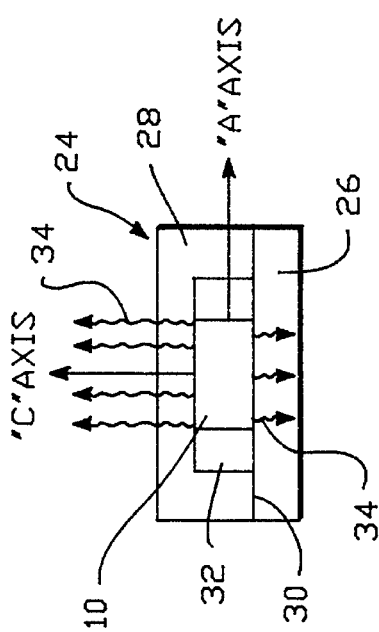
FIG. 4 illustrates the heat conduction path when the anisotropic crystal is positioned in the mount.

Air gap 32 creates thermal isolation between "a" axis crystal faces 20, 22 and heat sink 24. Alternatively, air gap 32 can be eliminated by substituting an insulating material between heat sink 24 and "a" axis crystal faces 20 and 22. Suitable insulating materials include but are not limited to epoxies such as 2135D, available from Tra-Con, Inc., Medford, Mass. A heat conduction path 34, shown in FIG. 4, transfers thermal energy from crystal 10 out through "c" axis crystal faces 16 and 18. Managing the heat flow of isotropic crystal 10 produces a non-elliptical thermal lens. A round, diffraction limited beam is produced.

Heat transfer conducted primarily from "a" axis crystal faces 20 and 22 is not very effective. The thermal lens created is elliptical, with an ellipse of about 1.2 to 1 ratio. Additionally, heat conductivity from "a" axis crystal faces 20 and 22 is limited.

The combination of crystal 10 mounted in heat sink 24 produces a non-elliptical thermal lens 36. A crystal 10 geometry is selected where heat does not flow radially. Heat sink 24 controls the direction of the heat flow to produce, in one embodiment, a non-elliptical output.

Figure 5:
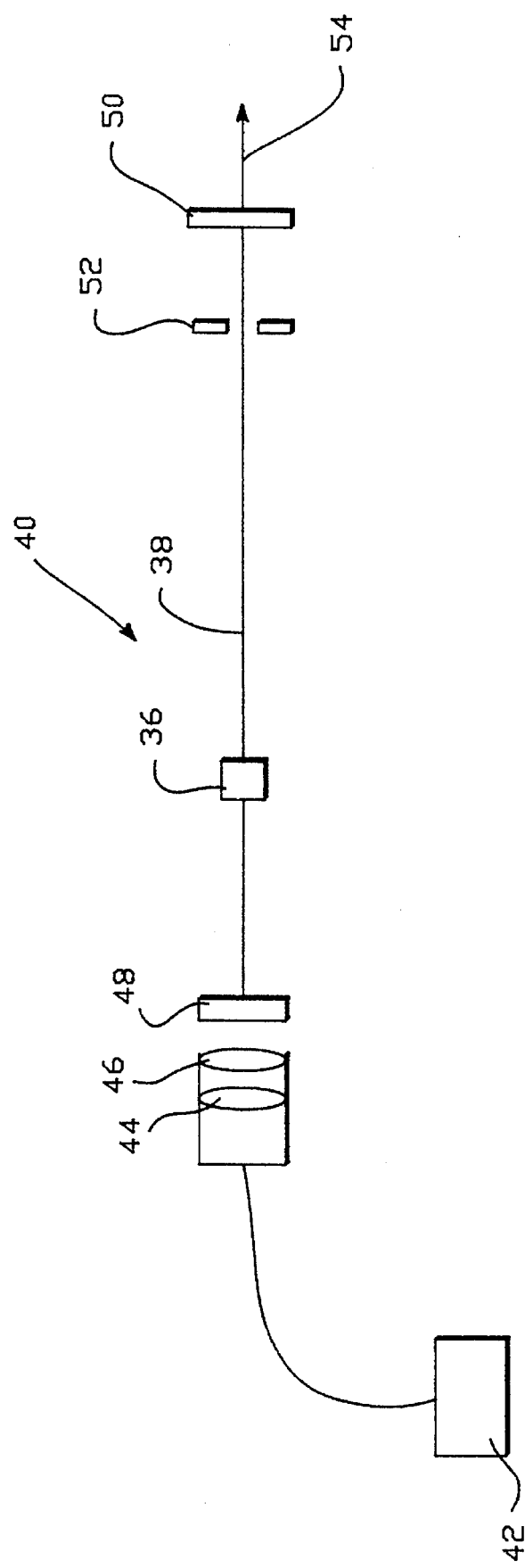
FIG. 5 is a schematic diagram of a laser resonator with the anisotropic thermal lens.

As shown in FIG. 5, thermal lens 36 can be mounted along an optical axis 38 of two mirror laserhead 40. In one embodiment, laserhead 40 is end-pumped by a fiber-bundle-coupled diode bar 42. A suitable diode bar 42 may be 15 or 20 W, model No. OPC-A020-810, available from Opto-Power Corporation, City of Industry, Calif. Spherical lenses 44 and 46, available from Spectra-Physics Lasers, Mountain View, Calif., are used to image the output end of diode bar 42 onto optical end face 14. One lens or a plurality of lenses can be used in a standard imaging configuration.

A high reflector 48 is highly transmitting at the diode pumping wavelength of diode bar 42. An output coupler 50 is positioned opposite high reflector 48. Optionally, an aperture stop 52 may be included.

The beam size in laserhead 40 can be about 0.2 to 1.0 mm, and in one embodiment it is about 0.6 mm in crystal 10 with a pump beam size of about 0.6 mm. Thermal lens 36 focusses the beam at output coupler 50 to a smaller size. With a 0.6 mm beam in crystal 10, the size of the beam at output coupler 50 is about 0.3 to 0.35 mm. It can become smaller by increasing the distance between output coupler 50 and high reflector 48. The limitation on increasing the distance is that it can not become so long as to make the resonator unstable. Beam size can also be decreased by pumping crystal 10 harder.

Thermal lens 36 can be utilized in a variety of laserheads. These include but are not limited to multi-port designs and in various folded geometries such as "V", "W" and "Z".

In one embodiment, approximately 13 W of diode pump power is delivered to crystal 10 Coupling of laserhead 40 with an optical fiber is achieved with quick disconnect, as disclosed in U.S. Pat. No. 4,665,529, incorporated herein by reference. Additionally, coupling can be achieved as set forth in U.S. Pat. No. 5,127,068, incorporated herein by reference. The size of the pump beam can be adjusted to mode-match the size of the TEMOO mode of the laser resonator. Achievement of mode-matching is disclosed in U.S. Pat. No. 4,653,056, incorporated herein by reference. Mode-matching is desirable but not necessary to obtain the round diffraction limited beam. This pump power produces approximately 5 W of power at 1.064 micrometers in a beam of excellent spatial quality.

The output beam is substantially round, its' M2 is less than about 1.05 and the least squares deviation of the beam profile from a gaussian is less than about 1%.

Figure 6:
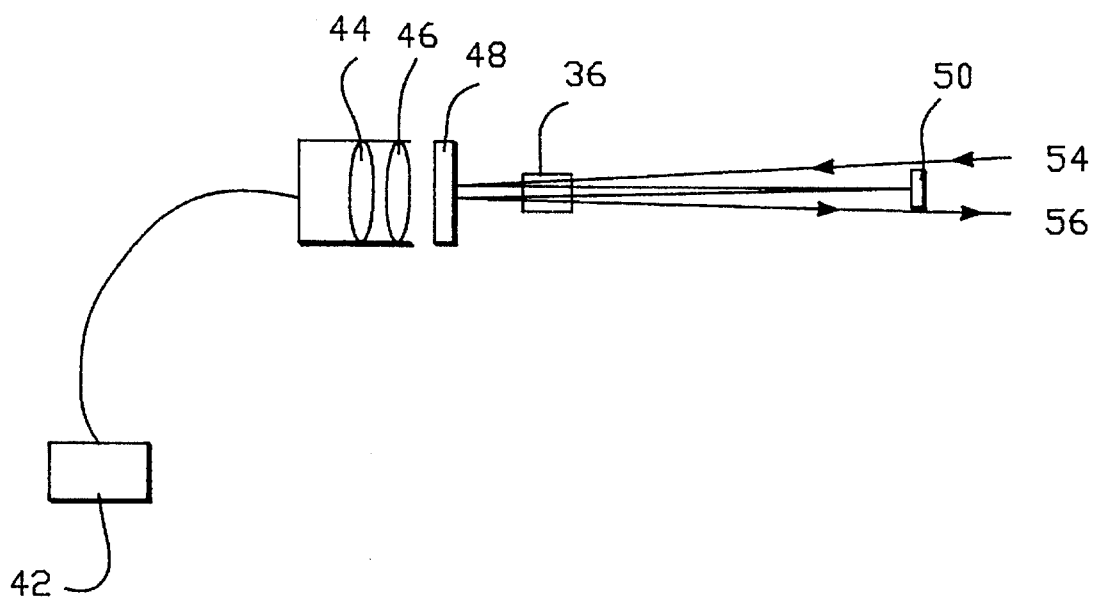
FIG. 6 is a schematic diagram of a laser amplifier with the anisotropic thermal lens.

In FIG. 6, a multipass amplifier is shown. The paths of input beam 54 and amplified output beam 56 are illustrated.

Changes and modifications in the specifically described embodiments can be carried out without departing from the scope of the invention which is intended to be limited only by the scope of the appended claims.

What is claimed is:

1. A thermal lens, comprising:

a pump induced thermal lens in an anisotropic laser crystal having a focal length fx in an x direction, a focal length fy in a y direction, and a desired fx/fy ratio, the anisotropic crystal providing amplification for an output beam and having opposing first and second end faces through which a pump beam and the output beam pass; and a mount supporting the crystal and directing a heat flow in the crystal to produce the desired fx/fy ratio.

2. The thermal lens of claim 1, wherein the lens produces a radially symmetric output beam when positioned in a laser.

3. The thermal lens of claim 1, wherein the lens produces a diffraction limited output beam when positioned in a laser.

4. The thermal lens of claim 1, wherein the lens produces a substantially TEMOO output beam when positioned in a laser.

5. The thermal lens of claim 1, wherein an M2 of an output beam is less than about 1.2.

6. The thermal lens of claim 1, wherein a least squares deviation of an output beam profile from a gaussian is less than about 10%.

7. The thermal lens of claim 1, wherein the crystal is made substantially of Nd:YVO4.

8. The thermal lens of claim 7, wherein the crystal has about 0.5 to 3.0% atomic percentage of Nd.

9. The thermal lens of claim 1, wherein the crystal has a substantially cubic geometry.

10. The thermal lens of claim 1, wherein the crystal has a substantially rectangular geometry.

11. A non-elliptical thermal lens, comprising:

an Nd:YVO$_4$ crystal having opposing a first and a second optical end faces through which a pump beam and an output beam pass, opposing "c" axis crystal faces normal to a "c" axis of the crystal, and opposing "a" axis crystal faces normal to an "a" axis of the crystal; and a mount supporting the crystal, the mount providing a path to conduct heat generated in the crystal through the "c" faces and thermally isolate the "a" faces from the heat conduction created in the crystal.

12. The thermal lens of claim 11, wherein the lens produces a radially symmetric output beam when positioned in a laser.

13. The thermal lens of claim 11, wherein the lens produces a diffraction limited output beam when positioned in a laser.

14. The thermal lens of claim 11, wherein the lens produces a substantially TEMOO output beam when positioned in a laser.

15. The thermal lens of claim 11, wherein an M2 of the output beam is less than about 1.2.

16. The thermal lens of claim 11, wherein a least squares deviation of an output beam profile from a gaussian is less than about 10%.

17. The thermal lens of claim 11, wherein the crystal has about 0.5 to 3.0% atomic percentage of Nd.

18. The thermal lens of claim 11, wherein the crystal has a substantially cubic geometry.

19. The thermal lens of claim 11, wherein the crystal has a substantially rectangular geometry.

20. The thermal lens of claim 11, wherein the optical end faces are about 3 to 4 mm in length.

21. The thermal lens of claim 11, wherein the optical end faces are about 1 mm in length.

22. The thermal lens of claim 11, wherein the crystal has a length of about 1 to 10 mm.

23. The thermal lens of claim 11, wherein the optical end faces include an antireflection coating.

24. A thermal lens of controlled ellipticity, comprising:

an anisotropic laser crystal providing amplification for an output beam, the anisotropic crystal having opposing a first and a second optical end faces through which a pump beam and an output beam pass, opposing "c" axis crystal faces normal to a "c" axis of the crystal, and opposing "a" axis crystal faces normal to an "a" axis of the crystal;

a heat sink mount for the crystal, the heat sink providing a support for the crystal and including a heat sink for conducting substantially all heat generated in the crystal away from the crystal through the "c" axis crystal faces.

25. The thermal lens of claim 24, wherein the heat sink provides thermal isolation along the "a" crystal faces.

26. The thermal lens of claim 24, wherein the heat sink mount is made of copper.

27. The thermal lens of claim 26, wherein the copper heat sink is plated with an adherence material.

28. The thermal lens of claim 27, wherein the adherence material is nickel or silver.

29. The thermal lens of claim 26, wherein a solder is interposed between the "c" axis crystal faces and the copper heat sink.

30. The thermal lens of claim 29, wherein the solder is substantially a low temperature solder.

31. The thermal lens of claim 30, wherein the solder is made substantially of indium.

32. The thermal lens of claim 26, wherein a thermally conductive material is interposed between the copper heat sink and the "c" axis crystal faces.

33. The thermal lens of claim 32, wherein the thermally conductive material is an epoxy.

34. The thermal lens of claim 32, wherein the thermally conductive material is a thermal grease.

35. The thermal lens of claim 24, wherein the heat sink is in contact with the "a" axis crystal faces and provides a thermal insulator at the "a" axis crystal faces.

36. The thermal lens of claim 35, wherein the thermal insulator is an epoxy.

37. The thermal lens of claim 24, wherein an air gap is provided between the heat sink and the "a" axis crystal faces.

38. The thermal lens of claim 24, wherein a thermal insulator is deposited on the "a" axis crystal faces.

39. The thermal lens of claim 24, wherein the crystal is made substantially of Nd:YVO4.

40. The thermal lens of claim 39, wherein the crystal is about 0.5 to 3.0% atomic percentage of Nd.

41. The thermal lens of claim 24, wherein the crystal has a substantially cubic geometry.

42. The thermal lens of claim 24, wherein the crystal has a substantially rectangular geometry.

43. The thermal lens of claim 24, wherein the optical end faces are about 3 to 4 mm in length.

44. The thermal lens of claim 43, wherein the optical end faces are about 1 mm in length.

45. The thermal lens of claim 24, wherein the crystal has a length of about 1 to 10 mm.

46. The thermal lens of claim 24, wherein the optical end faces include an antireflection coating.

* * * * *